(12) United States Patent
Tang et al.

(10) Patent No.: US 8,625,210 B2
(45) Date of Patent: Jan. 7, 2014

(54) MICRO-LENS MODULE

(75) Inventors: Nai-Yuan Tang, Tainan (TW);
Chuan-Hui Yang, Tainan (TW)

(73) Assignee: Himax Technologies Limited, Tainan (TW)

(*) Notice: Subject to any disclaimer, the term of this patent is extended or adjusted under 35 U.S.C. 154(b) by 41 days.

(21) Appl. No.: 13/101,349

(22) Filed: May 5, 2011

(65) Prior Publication Data
US 2012/0281301 A1 Nov. 8, 2012

(51) Int. Cl.
- *G02B 9/04* (2006.01)
- *G02B 3/02* (2006.01)
- *G02B 13/00* (2006.01)

(52) U.S. Cl.
CPC .................................. *G02B 13/003* (2013.01)
USPC ............................ 359/795; 359/717; 359/793

(58) Field of Classification Search
USPC .......................................... 359/793, 717, 795
See application file for complete search history.

(56) References Cited

U.S. PATENT DOCUMENTS 8,045,275 B2 * 10/2011 Park ............................... 359/680
2010/0046096 A1 * 2/2010 Hirao et al. .................... 359/795

* cited by examiner

*Primary Examiner* — Jack Dinh
(74) *Attorney, Agent, or Firm* — J.C. Patents

(57) ABSTRACT

A micro-lens module including a first lens group and a second lens group is provided. The first lens includes a first lens and a second lens arranged in sequence from the object side to the image side. The second lens is closest to the image side in the first lens group, and a surface of the second lens facing the image side is an aspheric surface. The second lens group includes a third lens and a fourth lens arranged in sequence from the object side to the image side. The first lens group is composed of a first complex lens. The first complex lens includes a plurality of lenses. The lenses are adhered to each other, and a refractive index of at least one lens in the lenses is different from refractive indexes of the other lenses.

6 Claims, 6 Drawing Sheets

MICRO-LENS MODULE

BACKGROUND OF THE INVENTION

1. Field of the Invention

The invention relates to a lens module, and more particularly to a micro-lens module.

2. Description of Related Art

Along with progress of technology, various portable electronic products such as mobile phones, personal digital assistants (PDAs), notebook computers, tablet computers, etc. are generally equipped with a micro camera lens to facilitate users taking pictures in daily life. With a development trend of continuous improvement in performance and declining in price, the camera function has become a basic function of the portable electronic products.

Generally, the micro camera lens is equipped with an image sensor, for example, a charge coupled device (CCD) or a complementary metal-oxide-semiconductor (CMOS) image sensor, etc., and a size of the image sensor gradually becomes smaller, so that a size of the camera lens of the portable electronic product is also reduced to satisfy the demand of portability. According to a current technique, although the lens on the portable electronic product has the advantage of small size, it has a poor imaging quality due to a serious reflection problem between interfaces of different materials.

SUMMARY OF THE INVENTION

The invention is directed to a micro-lens module capable of providing a good imaging quality and having a miniaturized size.

The invention provides a micro-lens module including a first lens group and a second lens group. The first lens group is disposed between an object side and an image side and has a positive refractive power. The first lens includes a first lens and a second lens arranged in sequence from the object side to the image side. The second lens is closest to the image side in the first lens group, and a surface of the second lens facing the image side is an aspheric surface. The second lens group is disposed between the first lens group and the image side and has a negative refractive power. The second lens group includes a third lens and a fourth lens arranged in sequence from the object side to the image side. The first lens group is composed of a first complex lens. The first complex lens includes a plurality of lenses. The lenses are adhered to each other, and a refractive index of at least one lens in the lenses is different from refractive indexes of the other lenses.

In an embodiment of the invention, the first lens group further includes a first transparent flat lens.

In an embodiment of the invention, surfaces of the first lens facing the object side and the image side are respectively a first surface and a second surface. Surfaces of the first transparent flat lens facing the object side and the image side are respectively a third surface and a fourth surface. Surfaces of the second lens facing the object side and the image side are respectively a fifth surface and a sixth surface. The second surface and the third surface are adhered to each other, and the fourth surface and the fifth surface are adhered to each other to form the first complex lens.

In an embodiment of the invention, the second lens group further includes a second transparent flat lens.

In an embodiment of the invention, the second lens group is composed of a second complex lens. The second complex lens includes a plurality of lenses adhered to each other. The lenses are adhered to each other, and a refractive index of at least one lens in the lenses is different from refractive indexes of the other lenses.

In an embodiment of the invention, surfaces of the third lens facing the object side and the image side are respectively a seventh surface and an eighth surface. Surfaces of the second transparent flat lens facing the object side and the image side are respectively a ninth surface and a tenth surface. Surfaces of the fourth lens facing the object side and the image side are respectively an eleventh surface and a twelfth surface. The eighth surface and the ninth surface are adhered to each other, and the tenth surface and the eleventh surface are adhered to each other to form the second complex lens.

In an embodiment of the invention, the first lens is a plano-convex lens, a convex surface of the first lens faces to the object side, and a plano-surface of the first lens faces to the image side. The second lens is a plano-convex lens, a plano-surface of the second lens faces to the object side, and a convex surface of the second lens faces to the image side.

In an embodiment of the invention, the third lens is a plano-concave lens, a concave surface of the third lens faces to the object side, and a plano-surface of the third lens faces to the image side. The fourth lens is a plano-convex lens, a plano-surface of the fourth lens faces to the object side, and a convex surface of the fourth lens faces to the image side.

In an embodiment of the invention, the first lens is a plano-concave lens, a concave surface of the first lens faces to the object side, and a plano-surface of the first lens faces to the image side. The second lens is a plano-convex lens, a plano-surface of the second lens faces to the object side, and a convex surface of the second lens faces to the image side.

In an embodiment of the invention, the third lens is a plano-convex lens, a convex surface of the third lens faces to the object side, and a plano-surface of the third lens faces to the image side. The fourth lens is a plano-concave lens, a plano-surface of the fourth lens faces to the object side, and a concave surface of the fourth lens faces to the image side.

In an embodiment of the invention, each of the first lens, the second lens, the third lens, and the fourth lens is an aspheric lens.

According to the above descriptions, based on a combination of the complex lens group and other lens groups, the micro-lens module of the invention has an improved imaging quality and a miniaturized size while considering a manufacturing convenience.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In exemplary embodiments of the invention, a micro-lens module includes a plurality of lens groups arranged from an object side to an image side, where at least one of the lens groups is composed of a complex lens. The complex lens includes a plurality of lenses adhered to each other, and a refractive index of at least one of the lenses is different from refractive indexes of the other lenses.

Figure 1A:
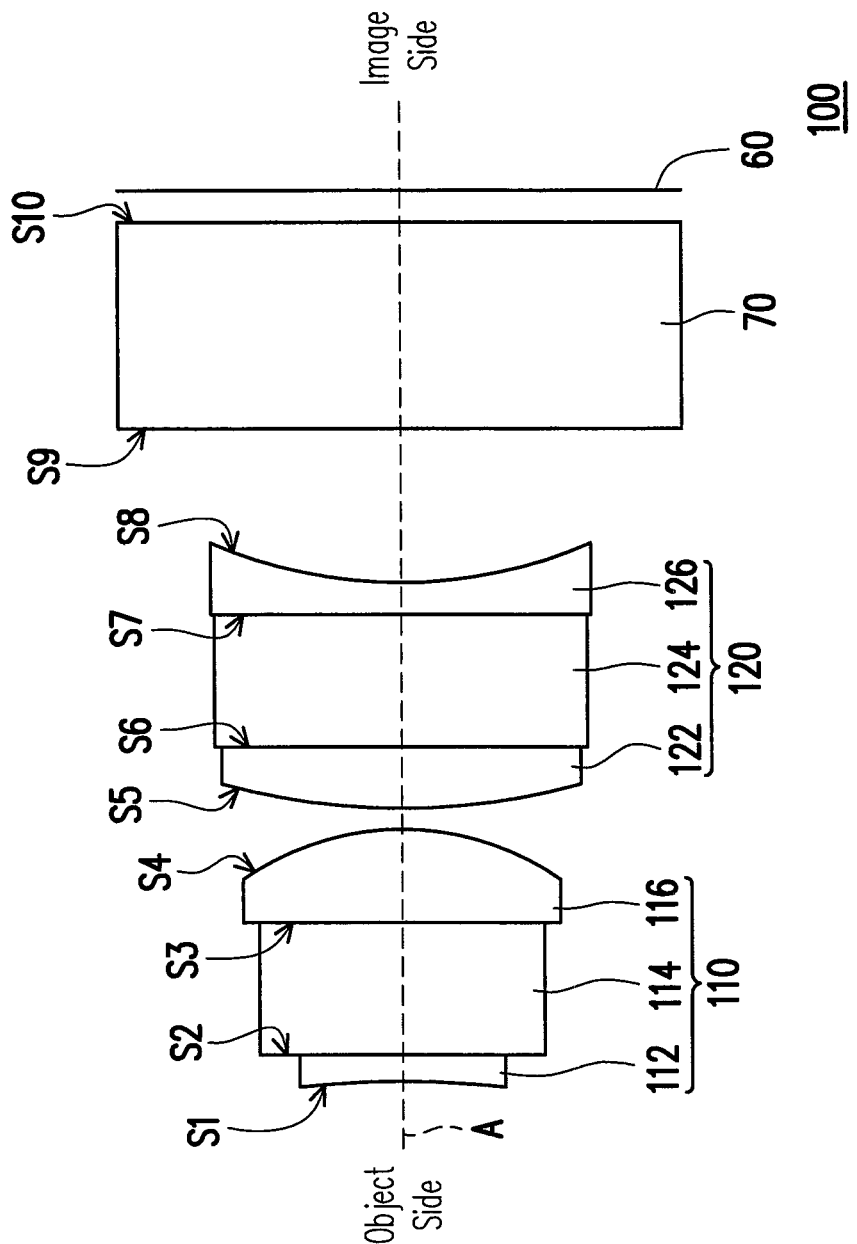
FIG. 1A is a structural schematic diagram of a micro-lens module according to an embodiment of the invention.

FIG. 1A is a structural schematic diagram of a micro-lens module according to an embodiment of the invention. Referring to FIG. 1A, in the present embodiment, the micro-lens module 100 includes a first lens group 110 and a second lens group 120. The first lens group 110 is disposed between the object side and the second lens group 120, is composed of a first complex lens, and has a positive refractive power. The first complex lens includes a first lens 112, a first transparent flat lens 114, and a second lens 116 arranged in sequence from the object side to the image side. In the present embodiment, the second lens 116 is closest to the image side in the first lens group 110, and a surface S4 of the second lens 116 facing the image side is an aspheric surface. In an exemplary embodiment of the invention, the complex lens is formed by a plurality of lenses adhered to each other, and a refractive index of at least one of the lenses is different from refractive indexes of the other lenses. For example, the first transparent flat lens 114 of the present embodiment has a refractive index different from that of the first lens 112 and the second lens 116, and the three lenses are adhered to form the first complex lens.

In detail, in the present embodiment, the first lens 112 is a plano-convex lens, of which a convex surface S1 faces to the object side, and a plano-surface S2 faces to the image side and which is adhered to a plane of the first transparent flat lens 114 to form an aperture stop. The second lens 116 is a plano-convex lens, of which a plano-surface S3 faces to the object side and which is adhered to a plane of the first transparent flat lens 114, and a convex surface S4 faces to the image side. In other words, one plane of the first transparent flat lens 114 of the present embodiment is adhered to the plano-surface S2 of the first lens 112, and the other plane thereof is adhered to the plano-surface S3 of the second lens 116 to form the first complex lens.

The second lens group 120 is disposed between the first lens group 110 and the image side, is composed of a second complex lens, and has a negative refractive power. It should be noted that, in other embodiments, the second lens group of the micro-lens module 100 is not limited to being composed of a complex lens. The second complex lens includes a third lens 122, a second transparent flat lens 124, and a fourth lens 126 arranged in sequence from the object side to the image side. The second transparent flat lens 124 of the present embodiment has a refractive index different from that of the third lens 122 and the fourth lens 126, and the three lenses are adhered to form the second complex lens.

In detail, in the present embodiment, the third lens 122 is a plano-convex lens, of which a convex surface S5 faces to the object side, and a plano-surface S6 faces to the image side and which is adhered to a plane of the second transparent flat lens 124. The fourth lens 126 is a plano-concave lens, of which a plano-surface S7 faces to the object side and which is adhered to a plane of the second transparent flat lens 124, and a concave surface S8 1 faces to the image side. In other words, one plane of the second transparent flat lens 124 of the present embodiment is adhered to the plano-surface S6 of the third lens 122, and the other plane thereof is adhered to the plano-surface S7 of the fourth lens 126 to form the second complex lens. Furthermore, in the present embodiment, each of the first lens 112, the second lens 116, the third lens 122, and the fourth lens 126 is an aspheric lens.

In the present embodiment, the micro-lens module 100 further includes a protection cover 70 disposed between the second lens group 120 and the image side for protecting an image sensor 60 located between a surface S10 and the image side. The protection cover 70 has two surfaces S9 and S10, where the surface S9 faces to the object side, and the surface S10 faces to the image side. In the present embodiment, a material of the protection cover 70 is a transparent material, for example, glass, or transparent resins, etc., and the image sensor 60 can be a charge coupled device (CCD), or a complementary metal-oxide-semiconductor (CMOS) sensor, etc.

An embodiment of the micro-lens module 100 is provided below. It should be noticed that data listed in following table 1 and table 2 are not used to limit the invention, and those skilled in the art can suitably change the parameters or settings therein without departing from the scope of the invention.

TABLE 1

| Surface | Radius of Curvature (mm) | Distance (mm) | Index of Refraction | Abbe Number | Notes |
|---|---|---|---|---|---|
| S1 | −5.128 | 0.0563 | 1.52 | 50 | first lens |
| S2 | infinity | 0.2567 | 1.51 | 70 | first transparent flat lens |
| S3 | infinity | 0.1815 | 1.52 | 50 | second lens |
| S4 | −0.513 | 0.0428 | | | |
| S5 | 1.471 | 0.1155 | 1.52 | 50 | third lens |
| S6 | infinity | 0.2567 | 1.51 | 70 | second transparent flat lens |
| S7 | infinity | 0.0599 | 1.52 | 50 | fourth lens |
| S8 | 1.071 | 0.3 | | | |
| S9 | infinity | 0.4 | 1.5168 | 64.17 | protection cover |
| S10 | infinity | 0.061 | | | |

In Table 1, the distance refers to a linear distance along the main axis A between two neighboring surfaces. For example, the distance of Surface S3 is the linear distance along the main axis A between Surface S3 and Surface S4. The distance, index of refraction, and Abbe number corresponding to each of the lenses listed in the "Notes" column can be found in the corresponding values for the distance, index of refraction, and Abbe number from each row. Moreover, in Table 1, surfaces S1 and S2 are two surfaces of the first lens 112, surfaces S3 and S4 are two surfaces of the second lens 116, surfaces S5 and S6 are two surfaces of the third lens 122, surfaces S7 and S8 are two surfaces of the fourth lens 126, and the surfaces S9 and S10 are two surfaces of the protection cover 70, where a value filled in the space field in the row of the surface S10 is a distance between the surface S8 and the image sensor 60.

The radius of curvature, the distance, and other parameters are shown in Table 1, so they are not further described herein.

The above surfaces S1, S4, S5, and S8 are aspheric surfaces with even power, and are expressed by the following formula:

$$Z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In the formula, Z is a sag in the direction of the optical axis A, and c is the inverse of the radius of an osculating sphere, i.e. the inverse of the radius of curvature (e.g., the radius of curvatures of Surfaces S1, S4, S5, and S8 in the Table 1) close to the optical axis A. k is a conic coefficient, r is a height of an aspheric surface, i.e. a height from a center to an edge of a lens, and $\alpha_1$-$\alpha_8$ are aspheric coefficients, and in the present embodiment, the coefficient $\alpha_1$ is 0. Parameters of the surfaces S1, S4, S5 and S8 are listed in a Table 2.

TABLE 2

| Aspheric Surface Parameter | 2nd order conic constant k | Coefficient $\alpha_2$ | Coefficient $\alpha_3$ | Coefficient $\alpha_4$ |
|---|---|---|---|---|
| S1 | 0 | −2.6132567 | 73.09426 | −3041.4389 |
| S4 | −13.60203 | −9.6468524 | 126.87827 | −1731.2702 |
| S5 | −49.9946 | 4.1097678 | −64.356174 | 596.94837 |
| S8 | 1.095574 | 1.859126 | −19.888752 | 133.55797 |

| Aspheric Surface Parameter | Coefficient $\alpha_5$ | Coefficient $\alpha_6$ | Coefficient $\alpha_7$ | Coefficient $\alpha_8$ |
|---|---|---|---|---|
| S1 | 37217.507 | 1144.2817 | −3587.0147 | 228907.05 |
| S4 | 12969.31 | 2396.5052 | −737768.44 | 3417732.6 |
| S5 | −1981.0921 | −11973.786 | 115195.88 | −252363.83 |
| S8 | −398.74397 | −480.14211 | 5863.3082 | −9972.8141 |

Moreover, in the present embodiment, an F number of the micro-lens module 100 is 2.8, and effective focal length is 1 mm, a field of view (FOV) is 60 degrees, an effective focal length of the first lens group 110 is 1.05 mm, and an effective focal length of the second lens group 120 is −12.01 mm, though the invention is not limited thereto.

Figure 1B:
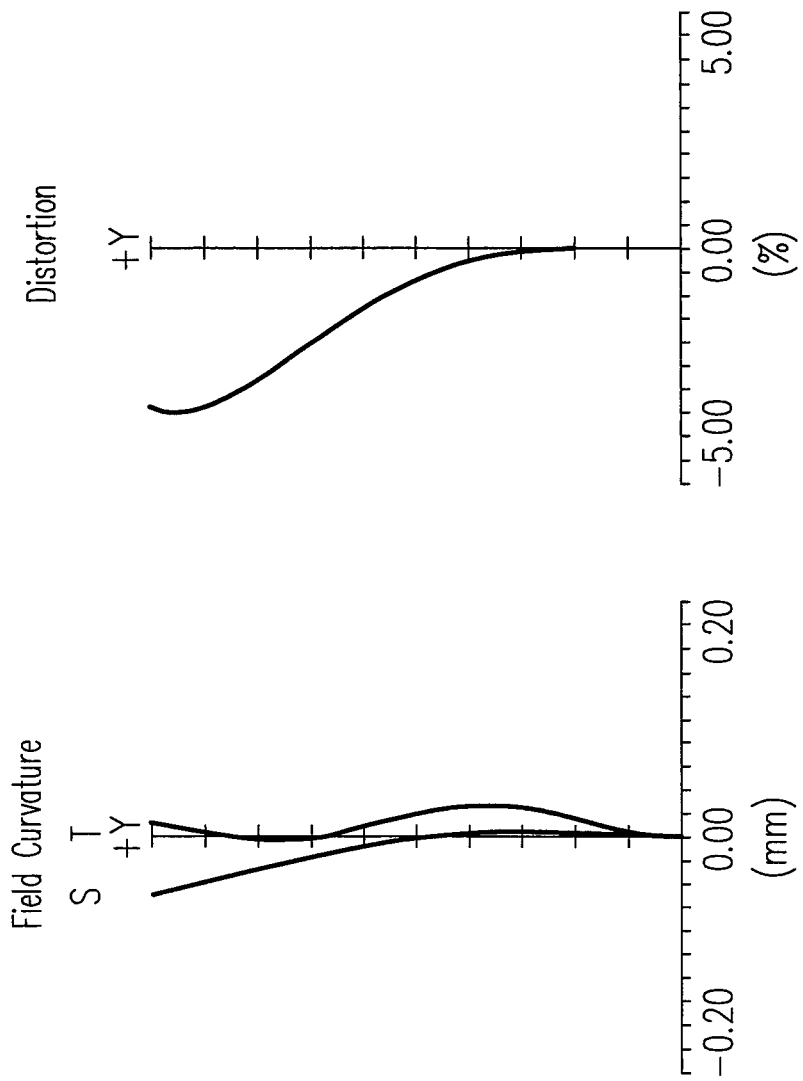
FIG. 1B and FIG. 1C are imaging optical simulation data diagrams of the micro-lens module of FIG. 1A.
Figure 1C:
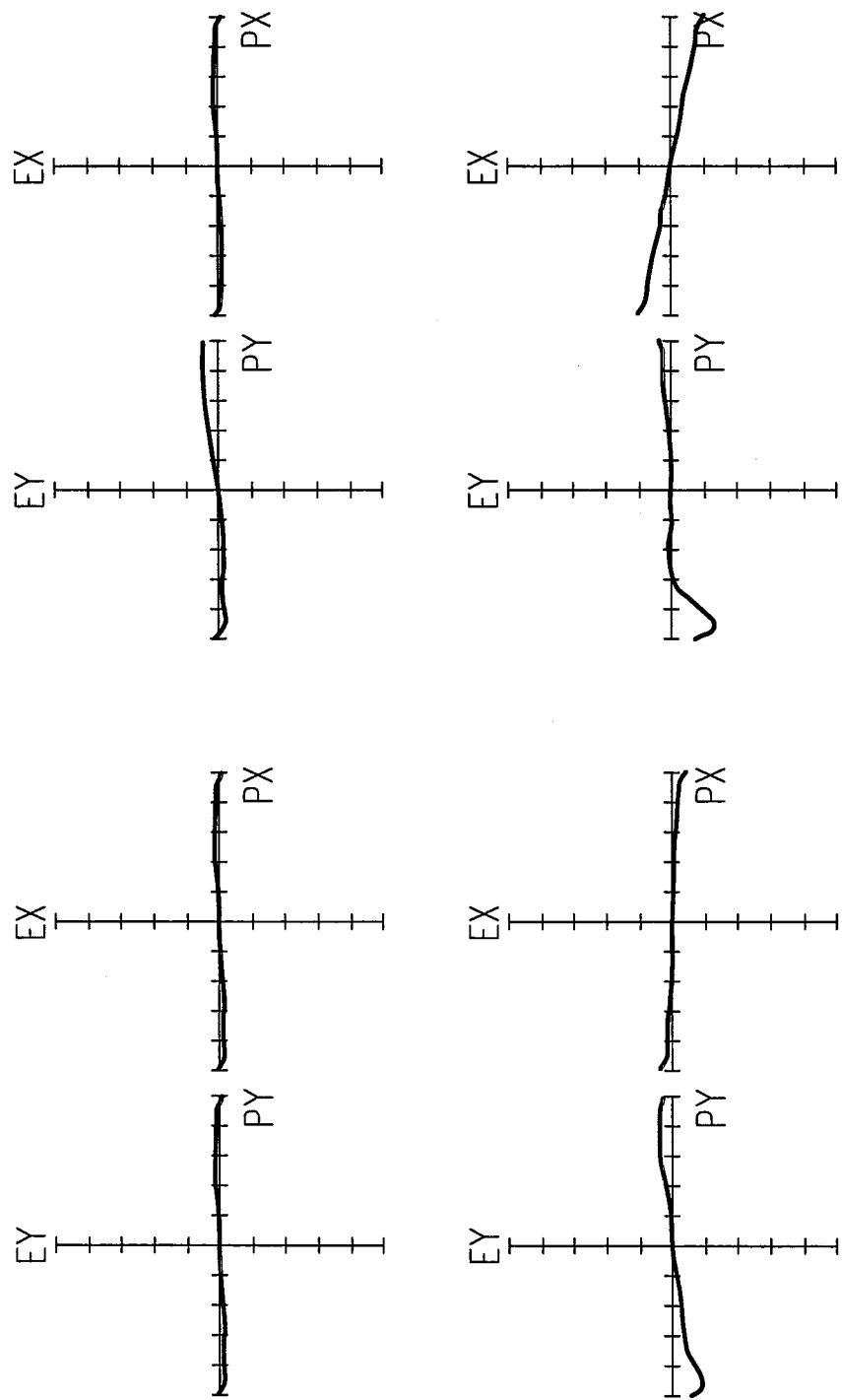

FIG. 1B and FIG. 1C are imaging optical simulation data diagrams of the micro-lens module 100 of FIG. 1A. Referring to FIG. 1B, a field curvature diagram and a distortion diagram are respectively illustrated from the left to the right. Moreover, FIG. 1C is a transverse ray fan plot of images. According to FIG. 1B and FIG. 1C, it is known that the micro-lens module 100 of the present embodiment has a good imaging quality while maintaining a miniaturized size.

Figure 2A:
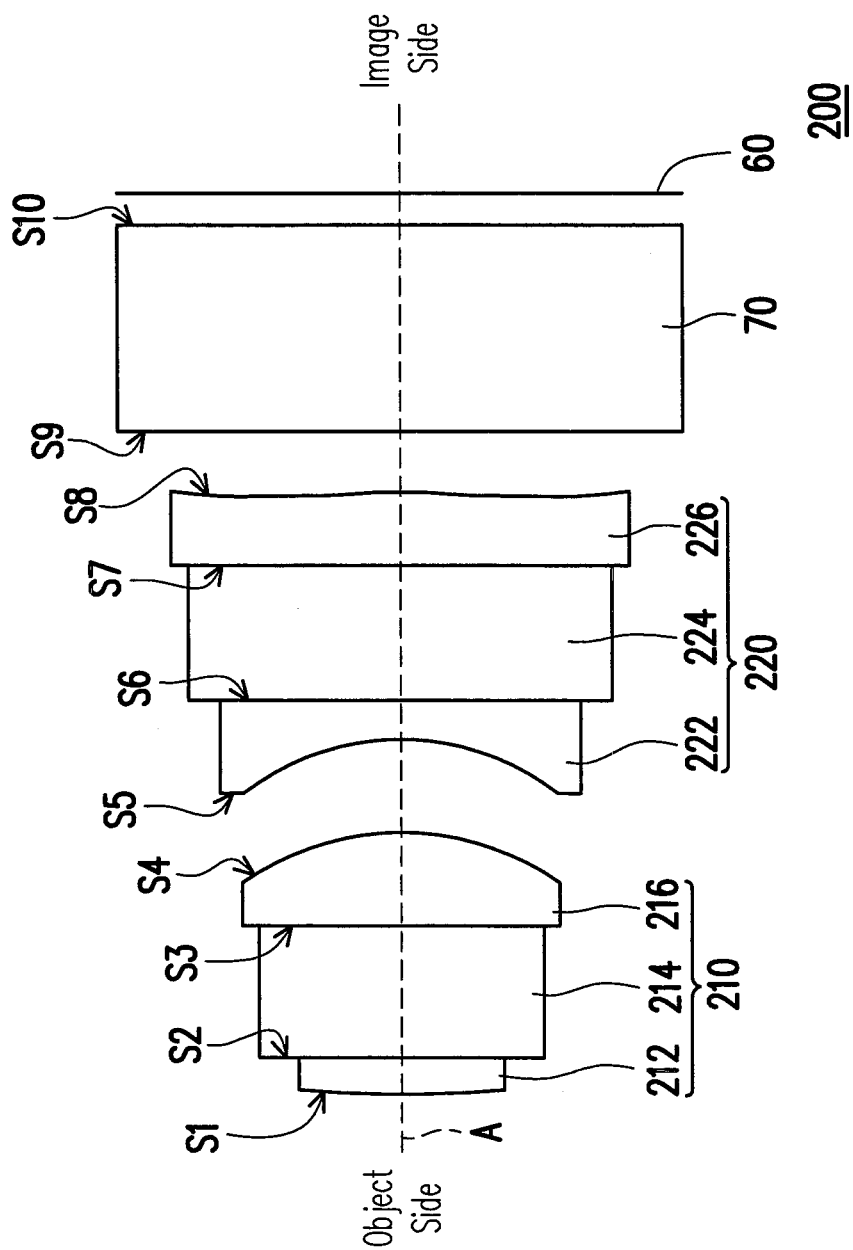
FIG. 2A is a structural schematic diagram of a micro-lens module according to another embodiment of the invention.

FIG. 2A is a structural schematic diagram of a micro-lens module according to another embodiment of the invention. Referring to FIG. 2A, the micro-lens module 200 of the present embodiment is similar to the micro-lens module 100 of FIG. 1A, and the differences there between are described below.

To be specific, in the present embodiment, the micro-lens module 200 includes a first lens group 210 and a second lens group 220. The first lens group 210 is disposed between the object side and the second lens group 220, is composed of a first complex lens, and has a positive refractive power. The first complex lens includes a first lens 212, a first transparent flat lens 214, and a second lens 216 arranged in sequence from the object side to the image side. In an exemplary embodiment of the invention, the complex lens is formed by a plurality of lenses adhered to each other, and a refractive index of at least one of the lenses is different from refractive indexes of the other lenses. For example, the first transparent flat lens 214 of the present embodiment has a refractive index different from that of the first lens 212 and the second lens 216, and the three lenses are adhered to form the first complex lens. In the present embodiment, the second lens 216 is closest to the image side in the first lens group 210, and a surface S4 of the second lens 216 facing the image side is an aspheric surface.

In detail, in the present embodiment, the first lens 212 is a plano-convex lens, of which a convex surface S1 faces to the object side, and a plano-surface S2 faces to the image side and which is adhered to a plane of the first transparent flat lens 214 to form an aperture stop. The second lens 216 is a plano-convex lens, of which a plano-surface S3 faces to the object side and which is adhered to a plane of the first transparent flat lens 214, and a convex surface S4 faces to the image side. In other words, one plane of the first transparent flat lens 214 of the present embodiment is adhered to the plano-surface S2 of the first lens 212, and the other plane thereof is adhered to the plano-surface S3 of the second lens 216 to form the first complex lens.

The second lens group 220 is disposed between the first lens group 210 and the image side, is composed of a second complex lens, and has a negative refractive power. It should be noted that, in other embodiments, the second lens group of the micro-lens module 200 is not limited to being composed of a complex lens. The second complex lens includes a third lens 222, a second transparent flat lens 224, and a fourth lens 226 arranged in sequence from the object side to the image side. The second transparent flat lens 224 of the present embodiment has a refractive index different from that of the third lens 222 and the fourth lens 226, and the three lenses are adhered to form the second complex lens.

In detail, in the present embodiment, the fourth lens 226 is a plano-convex lens, of which a plano-surface S7 faces to the object side and which is adhered to a plane of the second transparent flat lens 224, and a convex surface S8 faces to the image side. The third lens 222 is a plano-concave lens, of which a concave surface S5 faces to the object side, and a plano-surface S6 faces to the image side and which is adhered to a plane of the second transparent flat lens 224. In other words, one plane of the second transparent flat lens 224 of the present embodiment is adhered to the plano-surface S6 of the third lens 222, and the other plane thereof is adhered to the plano-surface S7 of the fourth lens 226 to form the second complex lens. Furthermore, in the present embodiment, each of the first lens 212, the second lens 216, the third lens 222, and the fourth lens 226 is an aspheric lens.

An embodiment of the micro-lens module 200 is provided below. It should be noticed that data listed in following table 3 and table 4 are not used to limit the invention, and those skilled in the art can suitably change the parameters or settings therein without departing from the scope of the invention.

TABLE 3

| Surface | Radius of Curvature (mm) | Distance (mm) | Index of Refraction | Abbe Number | Notes |
|---|---|---|---|---|---|
| S1 | 0.2628 | 0.0639 | 1.52 | 50 | first lens |
| S2 | infinity | 0.2515 | 1.51 | 70 | first transparent flat lens |

TABLE 3-continued

| Surface | Radius of Curvature (mm) | Distance (mm) | Index of Refraction | Abbe Number | Notes |
|---|---|---|---|---|---|
| S3 | infinity | 0.2149 | 1.52 | 50 | second lens |
| S4 | −0.265 | 0.1354 | | | |
| S5 | −0.283 | 0.0713 | 1.52 | 50 | third lens |
| S6 | infinity | 0.2515 | 1.51 | 70 | second transparent flat lens |
| S7 | infinity | 0.1382 | 1.52 | 50 | fourth lens |
| S8 | −1.223 | 0.1 | | | |
| S9 | infinity | 0.4 | 1.5168 | 64.17 | protection cover |
| S10 | infinity | 0.077 | | | |

In Table 3, the distance refers to a linear distance along the main axis A between two neighboring surfaces. For example, the distance of Surface S3 is the linear distance along the main axis A between Surface S3 and Surface S4. The distance, index of refraction, and Abbe number corresponding to each of the lenses listed in the "Notes" column can be found in the corresponding values for the distance, index of refraction, and Abbe number from each row. Moreover, in Table 3, surfaces S1 and S2 are two surfaces of the first lens 212, surfaces S3 and S4 are two surfaces of the second lens 216, surfaces S5 and S6 are two surfaces of the third lens 222, surfaces S7 and S8 are two surfaces of the fourth lens 226, and the surfaces S9 and S10 are two surfaces of the protection cover 70, where a value filled in the space field in the row of the surface S10 is a distance between the surface S8 and the image sensor 60.

The above surfaces S1, S4, S5, and S8 are aspheric surfaces with even power, and are expressed by the following formula:

$$Z = \frac{cr^2}{1 + \sqrt{1 - (1+k)c^2 r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In the formula, Z is a sag in the direction of the optical axis A, and c is the inverse of the radius of an osculating sphere, i.e. the inverse of the radius of curvature (e.g., the radius of curvatures of Surfaces S1, S4, S5, and S8 in the Table 3) close to the optical axis A. k is a conic coefficient, r is a height of an aspheric surface, i.e. a height from a center to an edge of a lens, and $\alpha_1$-$\alpha_8$ are aspheric coefficients, and in the present embodiment, the coefficient $\alpha_1$ is 0. Parameters of the surfaces S1, S4, S5 and S8 are listed in a Table 4.

TABLE 4

| Aspheric Surface Parameter | 2nd order conic constant k | Coefficient $\alpha_2$ | Coefficient $\alpha_3$ | Coefficient $\alpha_4$ |
|---|---|---|---|---|
| S1 | −31.60766 | −4.762182 | 142.92806 | −5026.7395 |
| S4 | −6.540471 | −24.743838 | 601.1817 | −9550.0428 |
| S5 | −1.535117 | 15.340242 | −247.87977 | 2421.9181 |
| S8 | 2.965206 | 5.7951023 | −30.400249 | 114.99385 |

| Aspheric Surface Parameter | Coefficient $\alpha_5$ | Coefficient $\alpha_6$ | Coefficient $\alpha_7$ | Coefficient $\alpha_8$ |
|---|---|---|---|---|
| S1 | 50330.12 | 23.154433 | −1507.0367 | 286.4907 |
| S4 | 56336.211 | 493979.31 | −9129582.1 | 37986439 |
| S5 | −13831.562 | 9674.4212 | 291160.63 | −766184.37 |
| S8 | −402.756 | 1035.8549 | 131.372 | −4398.7019 |

Moreover, in the present embodiment, an F number of the micro-lens module 200 is 2.8, and effective focal length is 1 mm, a field of view (FOV) is 60 degrees, an effective focal length of the first lens group 210 is 0.49 mm, and an effective focal length of the second lens group 220 is −0.85 mm, though the invention is not limited thereto.

Figure 2B:
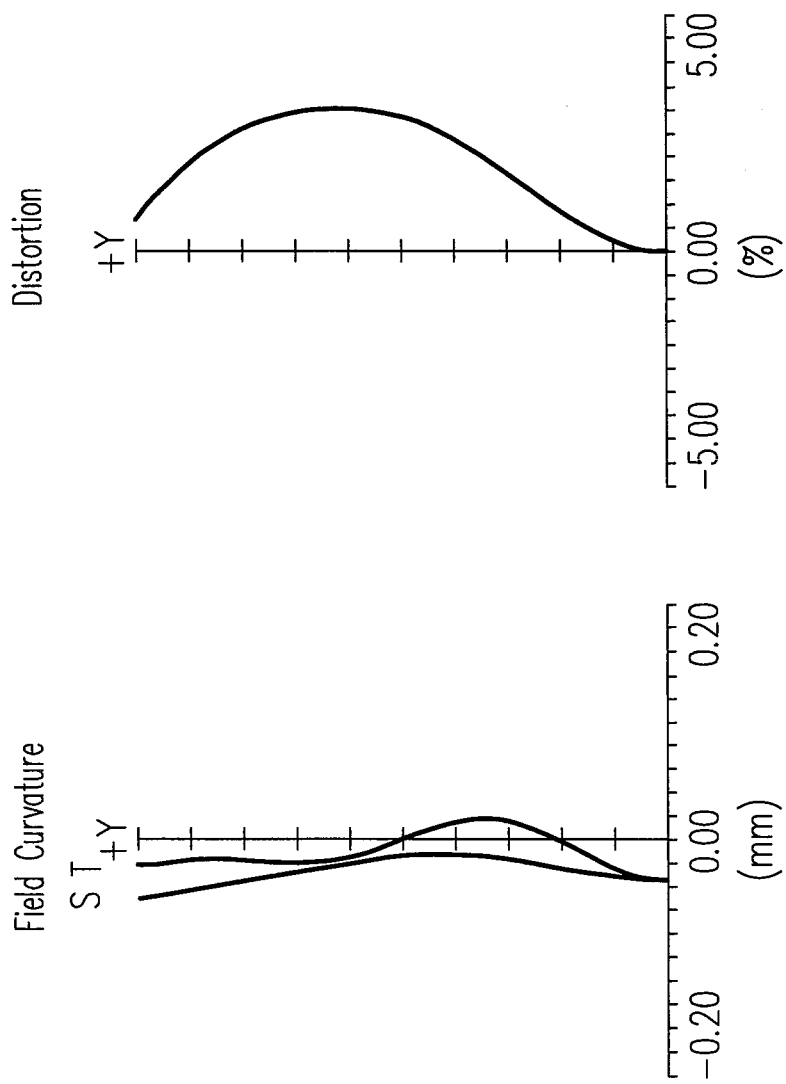
FIG. 2B and FIG. 2C are imaging optical simulation data diagrams of the micro-lens module of FIG. 2A.
Figure 2C:
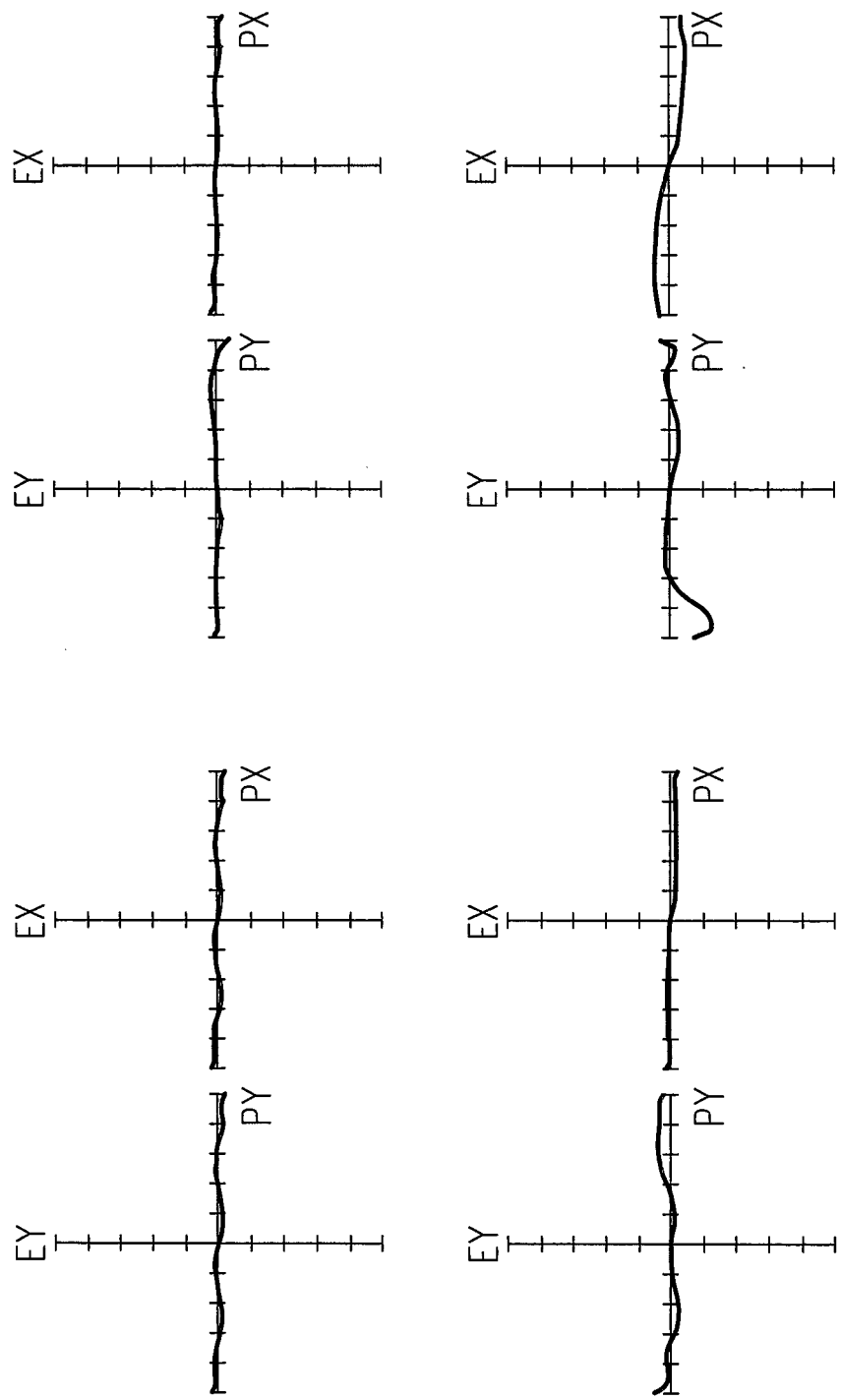

FIG. 2B and FIG. 2C are imaging optical simulation data diagrams of the micro-lens module 200 of FIG. 2A. Referring to FIG. 2B, a field curvature diagram and a distortion diagram are respectively illustrated from the left to the right. Moreover, FIG. 2C is a transverse ray fan plot of images. According to FIG. 2B and FIG. 2C, it is known that the micro-lens module 200 of the present embodiment may have a good imaging quality while maintaining a miniaturized size.

In summary, based on a combination of the complex lens group and other lens groups, the micro-lens module of the invention has an improved imaging quality and a miniaturized size while considering a manufacturing convenience.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A micro-lens module, comprising:
a first lens group disposed between an object side and an image side, having a positive refractive power, and comprising a first lens, a first transparent flat lens and a second lens arranged in sequence from the object side to the image side, wherein the second lens is closest to the image side in the first lens group, and a surface of the second lens facing the image side is an aspheric surface; and
a second lens group disposed between the first lens group and the image side, having a negative refractive power, and comprising a third lens, a second transparent flat lens and a fourth lens arranged in sequence from the object side to the image side,
wherein the first lens group is composed of a first complex lens, the first complex lens comprises a plurality of lenses adhered to each other, and a refractive index of at least one lens in the lenses is different from refractive indexes of the other lenses,
wherein the first lens is a plano-convex lens, a convex surface of the first lens faces to the object side, and a plano-surface of the first lens faces to the image side, and the second lens is a plano-convex lens, a plano-surface of the second lens faces to the object side, and a convex surface of the second lens faces to the image side, wherein the third lens is a plano-concave lens, a concave surface of the third lens faces to the object side, and a plano-surface of the third lens faces to the image side, and the fourth lens is a plano-convex lens, a plano-surface of the fourth lens faces to the object side, and a convex surface of the fourth lens faces to the image side.

2. The micro-lens module as claimed in claim 1, wherein surfaces of the first lens facing the object side and the image side are respectively a first surface and a second surface, surfaces of the first transparent flat lens facing the object side and the image side are respectively a third surface and a fourth surface, surfaces of the second lens facing the object side and the image side are respectively a fifth surface and a sixth surface, the second surface and the third surface are adhered to each other, and the fourth surface and the fifth surface are adhered to each other to form the first complex lens.

3. The micro-lens module as claimed in claim 1, wherein the second lens group is composed of a second complex lens, the second complex lens comprises a plurality of lenses adhered to each other, and a refractive index of at least one lens in the lenses is different from refractive indexes of the other lenses.

4. The micro-lens module as claimed in claim 3, wherein surfaces of the third lens facing the object side and the image side are respectively a seventh surface and an eighth surface, surfaces of the second transparent flat lens facing the object side and the image side are respectively a ninth surface and a tenth surface, surfaces of the fourth lens facing the object side and the image side are respectively an eleventh surface and a twelfth surface, the eighth surface and the ninth surface are adhered to each other, and the tenth surface and the eleventh surface are adhered to each other to form the second complex lens.

5. The micro-lens module as claimed in claim 1, wherein each of the first lens, the second lens, the third lens, and the fourth lens is an aspheric lens.

6. A micro-lens module, comprising:

a first lens group disposed between an object side and an image side, having a positive refractive power, and comprising a first lens, a first transparent flat lens and a second lens arranged in sequence from the object side to the image side, wherein the second lens is closest to the image side in the first lens group, and a surface of the second lens facing the image side is an aspheric surface; and a second lens group disposed between the first lens group and the image side, having a negative refractive power, and comprising a third lens, a second transparent flat lens and a fourth lens arranged in sequence from the object side to the image side, wherein the first lens group is composed of a first complex lens, the first complex lens comprises a plurality of lenses adhered to each other, and a refractive index of at least one lens in the lenses is different from refractive indexes of the other lenses, wherein the first lens is a plano-concave lens, a concave surface of the first lens faces to the object side, and a plano-surface of the first lens faces to the image side, and the second lens is a plano-convex lens, a plano-surface of the second lens faces to the object side, and a convex surface of the second lens faces to the image side, wherein the third lens is a plano-convex lens, a convex surface of the third lens faces to the object side, and a plano-surface of the third lens faces to the image side, and the fourth lens is a plano-concave lens, a plano-surface of the fourth lens faces to the object side, and a concave surface of the fourth lens faces to the image side.

* * * * *